United States Patent
Park et al.

(10) Patent No.: US 11,204,147 B1
(45) Date of Patent: Dec. 21, 2021

(54) HEADLIGHT UNIT HAVING MICRO-LIGHT EMITTING DIODE DEVICE, RELAY LENS SYSTEM AND PROJECTION LENS SYSTEM

(71) Applicant: GM GLOBAL TECHNOLOGY OPERATIONS LLC, Detroit, MI (US)

(72) Inventors: Jonglee Park, Troy, MI (US); Jodi M. Allen, Orion, MI (US); Scott P. Charnesky, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/234,958

(22) Filed: Apr. 20, 2021

(51) Int. Cl.
| | |
|---|---|
| *F21S 41/147* | (2018.01) |
| *F21S 41/663* | (2018.01) |
| *F21S 41/143* | (2018.01) |
| *F21S 41/153* | (2018.01) |
| *F21S 41/25* | (2018.01) |
| *F21S 41/20* | (2018.01) |
| *F21W 102/13* | (2018.01) |
| *F21Y 115/10* | (2016.01) |

(52) U.S. Cl.
CPC .......... *F21S 41/663* (2018.01); *F21S 41/143* (2018.01); *F21S 41/153* (2018.01); *F21S 41/25* (2018.01); *F21S 41/285* (2018.01); *F21W 2102/13* (2018.01); *F21Y 2115/10* (2016.08)

(58) Field of Classification Search
None
See application file for complete search history.

(56) References Cited

U.S. PATENT DOCUMENTS

| | | | | |
|---|---|---|---|---|
| 2008/0218993 | A1* | 9/2008 | Li | B61L 5/1827 362/84 |
| 2018/0149336 | A1* | 5/2018 | Tsai | F21S 41/143 |
| 2018/0313508 | A1* | 11/2018 | Kikuchi | F21S 41/39 |

* cited by examiner

*Primary Examiner* — Elmito Breval
(74) *Attorney, Agent, or Firm* — Quinn IP Law

(57) ABSTRACT

A headlight unit includes a housing, a micro-LED device mounted in the housing, a relay lens system mounted in the housing forward of the micro-LED device, and a projection lens system mounted in the housing forward of the relay lens system. The micro-LED device has a plurality of forward-facing micro-LEDs, wherein first, second and third subsets of the micro-LEDs are arranged in respective first, second and third 2D arrays. The relay lens system includes first, second and third relay lenses configured to receive and relay respective first, second and third streams of light emitted by the first, second and third subsets of micro-LEDs. The projection lens system includes first, second and third projection lenses configured to receive and project the first, second and third streams of light in respective first, second and third projection patterns.

20 Claims, 8 Drawing Sheets

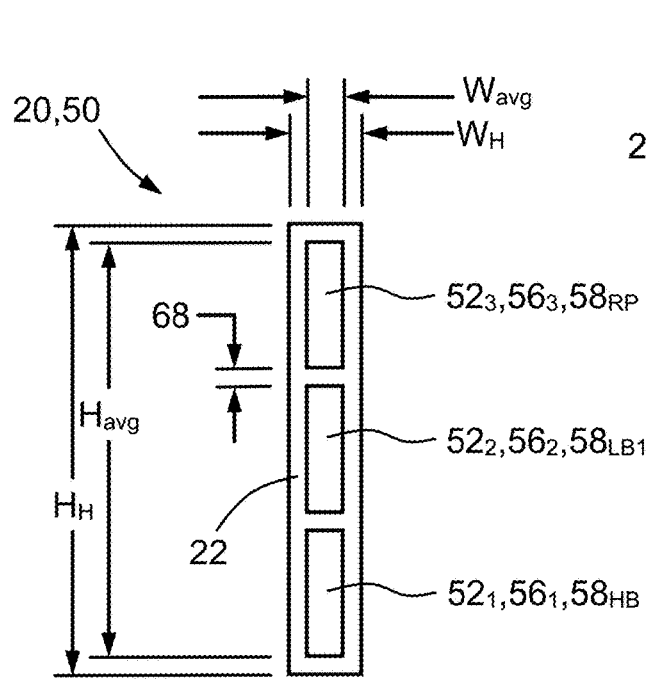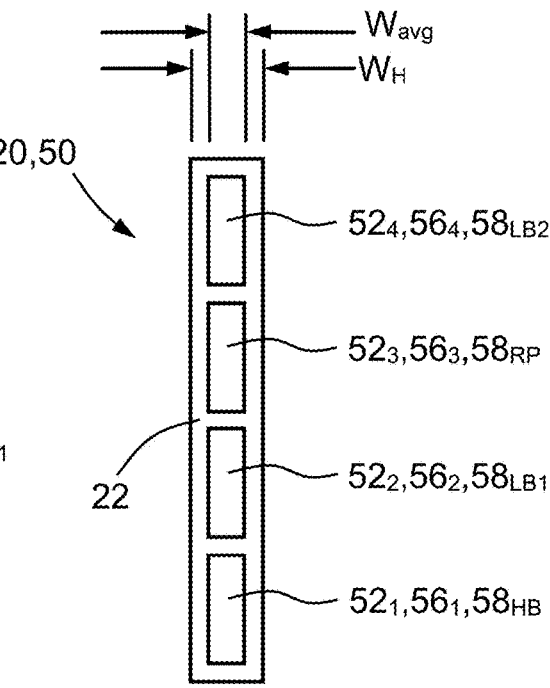
FIG. 11  FIG. 12
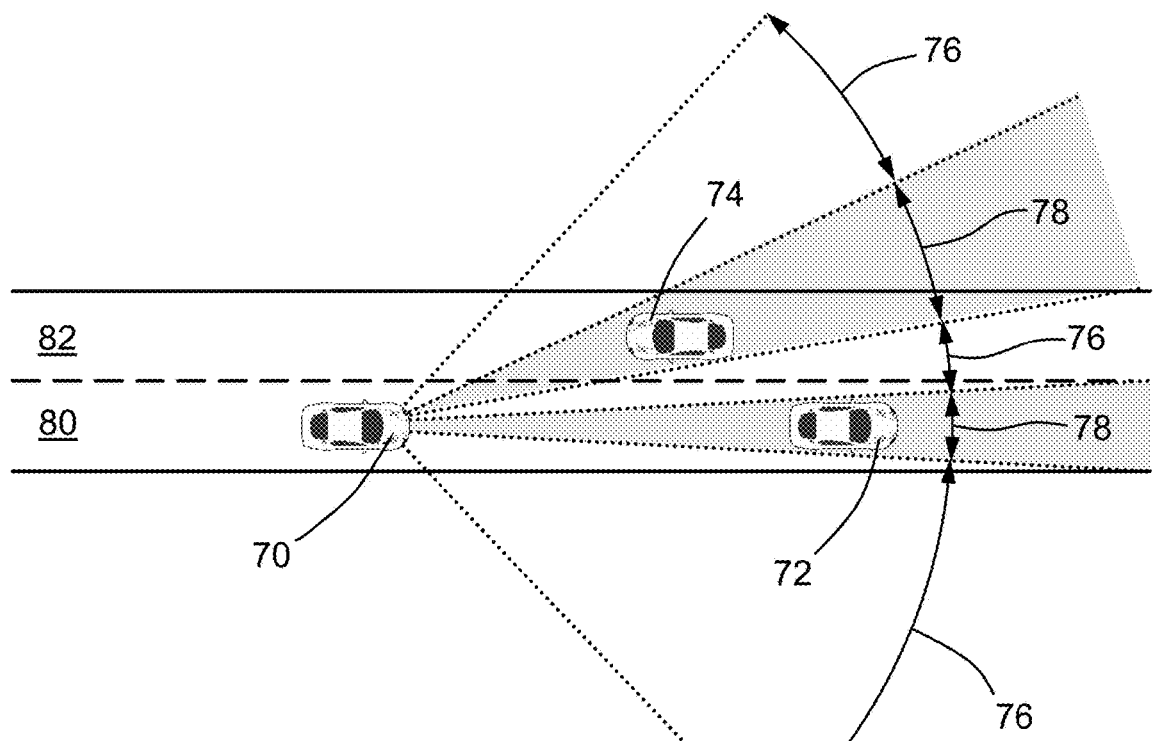
FIG. 13

HEADLIGHT UNIT HAVING MICRO-LIGHT EMITTING DIODE DEVICE, RELAY LENS SYSTEM AND PROJECTION LENS SYSTEM

INTRODUCTION

This disclosure relates generally to headlight units having a micro-LED (light emitting diode) device, and more particularly to headlight units having a micro-LED device, a relay lens system and a projection lens system.

Headlight units for automotive vehicles utilize a variety of light sources, such as incandescent bulbs, halogen bulbs, xenon high intensity discharge (HID) lamps and light emitting diodes (LEDs). These light sources are used to produce two or more lighting or projection patterns. The lighting or projection patterns produced by headlight units range from simple two-pattern options, such as high beam and low beam, to more complex multi-pattern options, such as low beam spread, low beam spot, high beam and road projection (e.g., the projection of symbols or information onto the road surface ahead of the vehicle). Additionally, one or more of these patterns may additionally or alternatively be "adaptive" or "variable", where one or more portions of the light source may be turned off or made less intense, so as to not project a full intensity beam at leading or oncoming vehicles, reflective traffic signs, etc. (This is accomplished by the vehicle utilizing sensors which sense the presence of such other vehicles or objects, and utilizing light sources, such as multiple LED sources, which can be selectively and dynamically turned on or off to produce the less-intensive beams aimed at the sensed vehicles or objects.) For example, so-called Advanced Headlight System (AHS) approaches may be used for producing an adaptive high beam projection or mode, and instead of or in addition to a customary low beam spot mode, a variable low beam "hot spot" mode may be provided in which the illuminated field may be divided into sectors in which there are no other vehicles or traffic signs (which may be lit with normal lighting intensity), other sectors in which there are other vehicles or traffic signs (which may be lit with reduced or no lighting intensity), and yet other sectors which may call for increased lighting intensity.

SUMMARY

According to one embodiment, a headlight unit, includes a housing having a front defining a forward direction, a micro-LED device mounted in the housing, a relay lens system mounted in the housing forward of the micro-LED device, and a projection lens system mounted in the housing forward of the relay lens system. The micro-LED device has a substrate and a plurality of micro-LEDs mounted on the substrate and facing in the forward direction, wherein a first subset of the micro-LEDs is arranged in a first two-dimensional (2D) array, a second subset of the micro-LEDs is arranged in a second 2D array, and a third subset of the micro-LEDs is arranged in a third 2D array. The relay lens system includes a first relay lens configured to receive and relay a first stream of light emitted by the first subset of micro-LEDs, a second relay lens configured to receive and relay a second stream of light emitted by the second subset of micro-LEDs, and a third relay lens configured to receive and relay a third stream of light emitted by the third subset of micro-LEDs. The projection lens system includes a first projection lens configured to receive and project the first stream of light in a first projection pattern, a second projection lens configured to receive and project the second stream of light in a second projection pattern, and a third projection lens configured to receive and project the third stream of light in a third projection pattern.

The projection lens system, as viewed in a rearward direction opposite the forward direction, may have a longitudinal axis and an average height as measured along the longitudinal axis, and a transverse axis perpendicular to the longitudinal axis and an average width as measured along the transverse axis, wherein the average width is smaller than the average height. In some configurations, the average height may be at least six times larger than the average width, and in some configurations the headlight unit may be configured for operative installation into an automotive vehicle such that the longitudinal axis is oriented in a generally vertical orientation. A respective illumination level of each of the micro-LEDs may be independently controllable. The first, second and third projection patterns may be different from each other; for example, the first projection pattern may be an adaptive high-beam pattern, the second projection pattern may be a low-beam spot pattern, and the third projection pattern may be a road projection pattern. The first, second and third relay lenses may be formed as a first unitary structure, and/or the first, second and third projection lenses may be formed as a second unitary structure. The housing may include first, second and third cavities formed therein, wherein the first, second and third cavities may be configured to operatively receive the first, second and third projection lenses therein, respectively.

The micro-LED device may further include a fourth subset of the micro-LEDs arranged in a fourth two-dimensional array, the relay lens system may include a fourth relay lens configured to receive and relay a fourth stream of light emitted by the fourth subset of micro-LEDs, and the projection lens system may further include a fourth projection lens configured to receive and project the fourth stream of light in a fourth projection pattern. In this configuration, the housing may include first, second, third and fourth cavities formed therein, wherein the first, second, third and fourth cavities may be configured to operatively receive the first, second, third and fourth projection lenses therein, respectively.

The housing may further include a light source mounted therein and configured to emit a fourth stream of light, and the projection lens system may further include a fourth projection lens configured to receive and project the fourth stream of light in a fourth projection pattern. In connection with this configuration, the housing may include first, second, third and fourth cavities formed therein, wherein the first, second, third and fourth cavities may be configured to operatively receive the first, second, third and fourth projection lenses therein, respectively.

According to another embodiment, a headlight unit includes: (i) a housing having a front defining a forward direction; (ii) a micro-LED device mounted in the housing, the micro-LED device having a substrate and a plurality of micro-LEDs mounted on the substrate and facing in the forward direction wherein a respective illumination level of each of the micro-LEDs is independently controllable, wherein first, second and third subsets of the micro-LEDs are arranged in respective first, second and third 2D arrays; (iii) a relay lens system mounted in the housing forward of the micro-LED device, the relay lens system including a first relay lens configured to receive and relay a first stream of light emitted by the first subset of micro-LEDs, a second relay lens configured to receive and relay a second stream of light emitted by the second subset of micro-LEDs, and a third relay lens configured to receive and relay a third stream of light emitted by the third subset of micro-LEDs; and (iv) a projection lens system mounted in the housing forward of the relay lens system, wherein the projection lens system, as viewed in a rearward direction opposite the forward direction, has a longitudinal axis and an average height as measured along the longitudinal axis, and a transverse axis perpendicular to the longitudinal axis and an average width as measured along the transverse axis, wherein the average height is at least six times larger than the average width, the projection lens system including a first projection lens configured to receive and project the first stream of light in an adaptive high-beam pattern, a second projection lens configured to receive and project the second stream of light in a low-beam spot pattern, and a third projection lens configured to receive and project the third stream of light in a road projection pattern.

The housing may include first, second and third cavities formed therein, wherein the first, second and third cavities may be configured to operatively receive the first, second and third projection lenses therein, respectively. The micro-LED device may further include a fourth subset of the micro-LEDs arranged in a fourth two-dimensional array, the relay lens system may include a fourth relay lens configured to receive and relay a fourth stream of light emitted by the fourth subset of micro-LEDs, and the projection lens system may further include a fourth projection lens configured to receive and project the fourth stream of light in a low-beam spread pattern. Alternatively, the housing may further include a light source mounted therein and configured to emit a fourth stream of light, and the projection lens system may further include a fourth projection lens configured to receive and project the fourth stream of light in a low-beam spread pattern.

According to yet another embodiment, a sub-assembly for an automotive vehicle includes: (i) a body sub-assembly having left and right front headlight mounting cavities, wherein each of the cavities is configured for operatively receiving a respective headlight unit therein; (ii) left and right headlight units operatively disposed in the left and right front headlight mounting cavities, respectively, wherein each of the headlight units includes respective ones of: (a) a housing having a front defining a forward direction; (b) a micro-LED device mounted in the housing, the micro-LED device having a substrate and a plurality of micro-LEDs mounted on the substrate and facing in the forward direction wherein a respective illumination level of each of the micro-LEDs is independently controllable, wherein first, second and third subsets of the micro-LEDs are arranged in respective first, second and third two-dimensional arrays; (c) a relay lens system mounted in the housing forward of the micro-LED device, the relay lens system including first, second and third relay lenses configured to receive and relay respective first, second and third streams of light emitted by the first, second and third subsets of micro-LEDs, respectively; and (d) a projection lens system mounted in the housing forward of the relay lens system, wherein the projection lens system, as viewed in a rearward direction opposite the forward direction, has a longitudinal axis and an average height as measured along the longitudinal axis, and a transverse axis perpendicular to the longitudinal axis and an average width as measured along the transverse axis, wherein the average height is larger than the average width, the projection lens system including a first projection lens configured to receive and project the first stream of light in an adaptive high-beam pattern, a second projection lens configured to receive and project the second stream of light in a low-beam spot pattern, and a third projection lens configured to receive and project the third stream of light in a road projection pattern; (iii) wherein the housing includes first, second and third cavities formed therein, wherein the first, second and third cavities are configured to operatively receive the first, second and third projection lenses therein, respectively.

In this configuration, the housing may further include a fourth cavity formed therein, the micro-LED device may further include a fourth subset of the micro-LEDs arranged in a fourth two-dimensional array, the relay lens system may include a fourth relay lens configured to receive and relay a fourth stream of light emitted by the fourth subset of micro-LEDs, and the projection lens system may further include a fourth projection lens configured to receive and project the fourth stream of light in a low-beam spread pattern, wherein the fourth cavity is configured to operatively receive the fourth projection lens therein. Alternatively, the housing may further include a fourth cavity formed therein, the housing may further include a light source mounted therein and configured to emit a fourth stream of light, and the projection lens system may further include a fourth projection lens configured to receive and project the fourth stream of light in a low-beam spread pattern, wherein the fourth cavity is configured to operatively receive the fourth projection lens therein. Further, in any of the foregoing configurations, each of the left and right front headlight mounting cavities may be oriented such that the respective longitudinal axis of each respective projection lens system is oriented in a generally vertical orientation.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

FIGS. 11-12 are schematic front views of headlight units having three and four projection lenses, respectively.

FIG. 13 is a schematic top view of a highway showing leading and oncoming vehicles.

DETAILED DESCRIPTION

Figure 1:
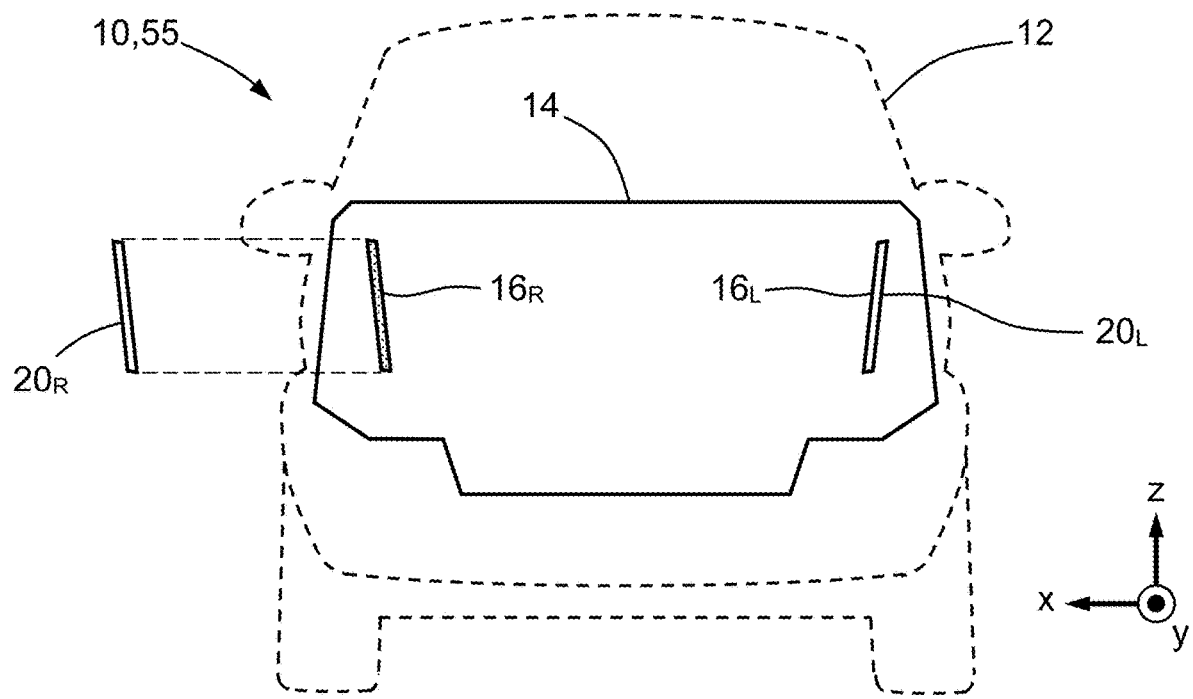
FIG. 1 is a schematic front view of a sub-assembly for an automotive vehicle, including a body sub-assembly and left and right headlight units.

Referring now to the drawings, wherein like numerals indicate like parts in the several views, a headlight unit 20, and a sub-assembly 10 for an automotive vehicle 12 including the headlight unit 20, are shown and described herein. Note that certain reference numerals in the drawings have subscripts, such as the first, second, third and fourth subsets $34_1$, $34_2$, $34_3$ and $34_4$ of micro-LEDs 32 of FIG. 5B. Subscripts are used in the drawings and in the present description to refer to individual elements or individual groupings or collections of elements (such as the aforementioned subsets), while the use of reference numerals without subscripts may refer to the collective group of such elements, groupings or collections, and/or to a singular but generic one of such elements, groupings or collections. Thus, reference numeral $34_1$ refers to a specific subset of micro-LEDS 32, while reference numeral 34 (without the subscript) may refer to all the subsets, the group of subsets, or a singular but generic subset (i.e., any subset).

Figure 2:
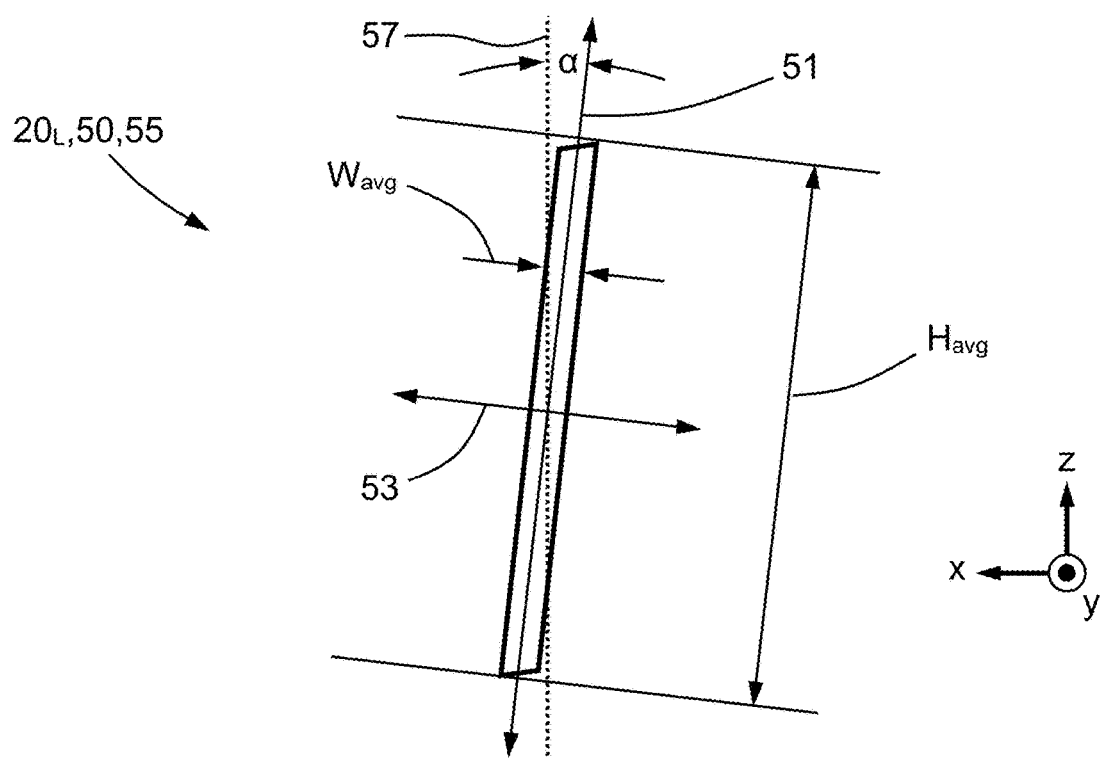
FIG. 2 is a schematic front view of a left headlight unit.
Figure 3:
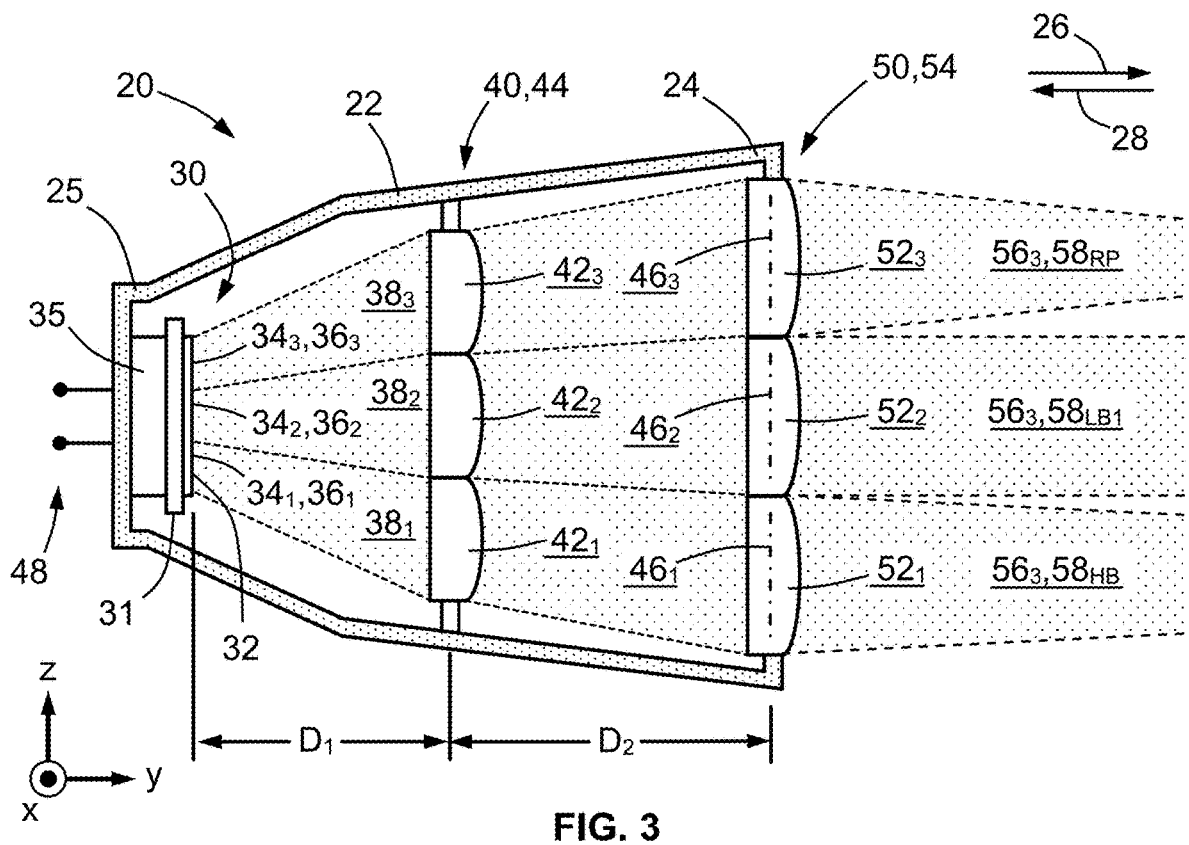
FIG. 3 is a schematic cross-sectional side view of a headlight unit.
Figure 4:
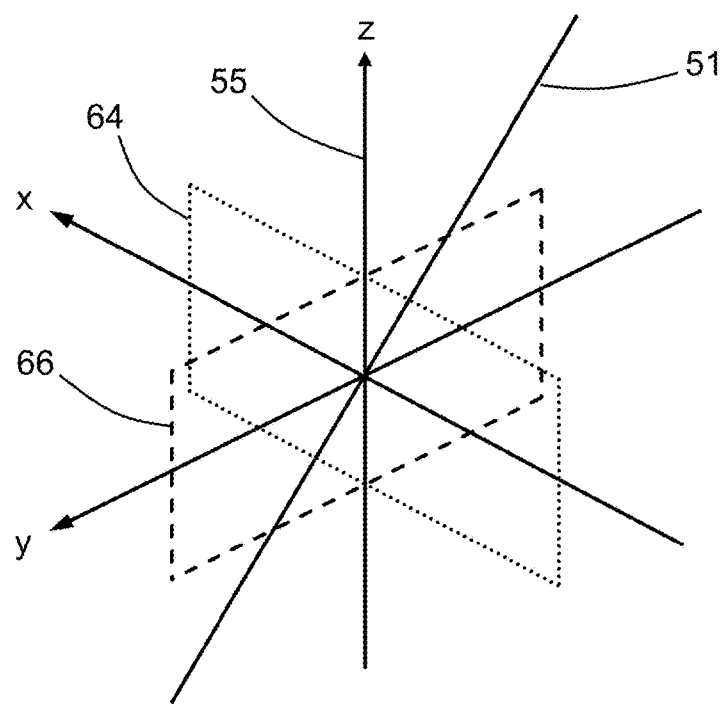
FIG. 4 shows an x-y-z coordinate system along with x-z and y-z planes.

FIG. 1 shows a schematic front view of the sub-assembly 10 for an automotive vehicle 12, including a body sub-assembly 14, left and right front headlight cavities $16_L$, $16_R$ and left and right headlight units $20_L$, $20_R$, and FIGS. 2-3 show schematic front and cross-sectional side views, respectively, of a headlight unit 20. As shown in the drawings, x-, y- and z-directions may be defined using the customary right-hand rule convention, with the x-direction pointing from the left side of a vehicle 12 to the right side (i.e., "rightward"), the y-direction pointing from the rear of the vehicle 12 to the front of the vehicle 12 (i.e., "forward"), and the z-direction pointing from underneath the vehicle 12 to above the vehicle 12 (i.e., "upward", which is parallel with a vertical direction 57). FIG. 4 shows the x-, y- and z-directions along with the x-z and y-z planes 64, 66.

Figure 10:
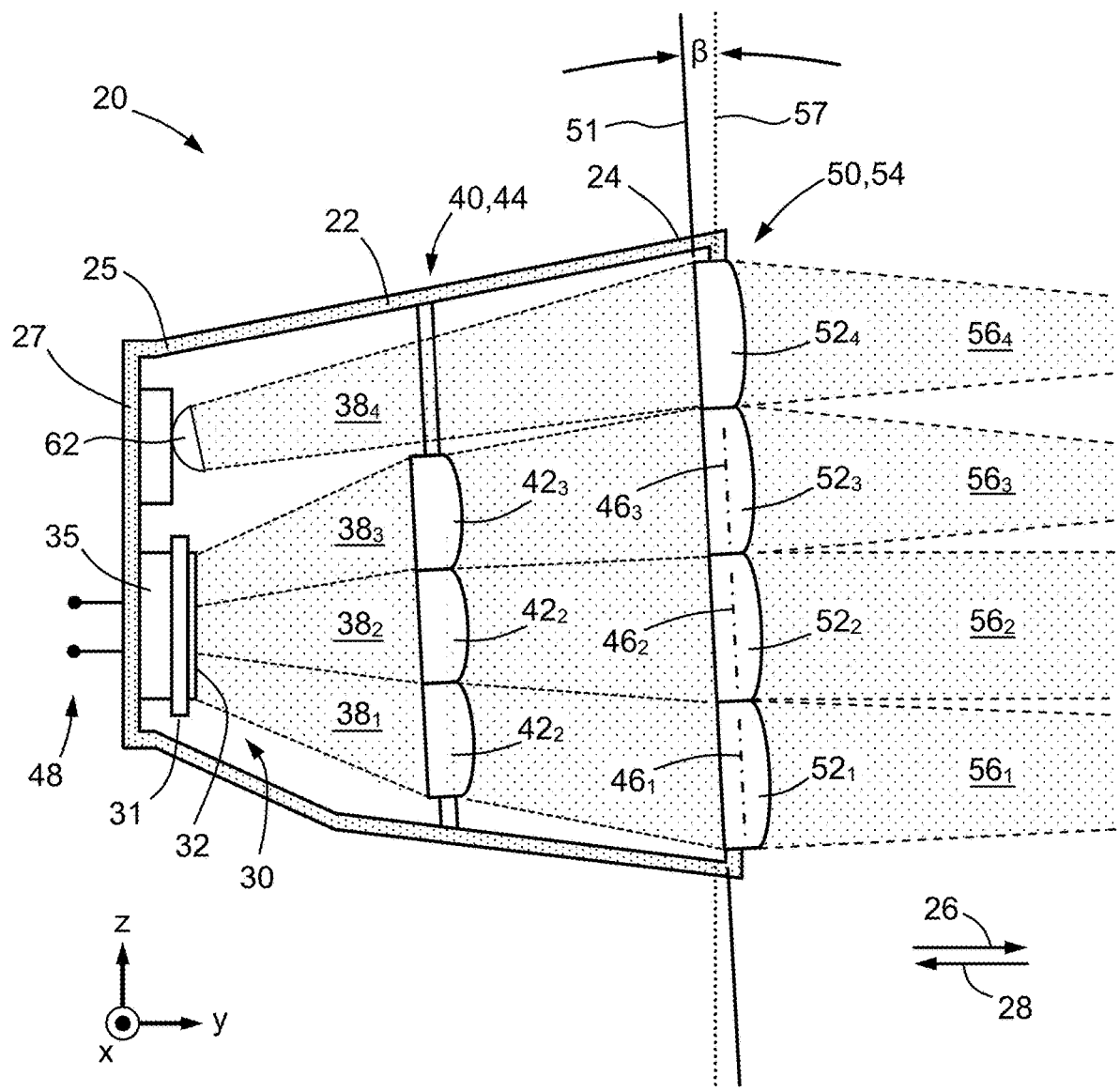
FIG. 10 is a schematic cross-sectional side view of a headlight unit utilizing a micro-LED device with four arrays of micro-LEDs.

The sub-assembly 10 includes a body sub-assembly 14 having left and right front headlight cavities $16_L$, $16_R$, wherein each of the cavities $16_L$, $16_R$ is configured for operatively receiving a respective headlight unit $20_L$, $20_R$ therein. The body sub-assembly 14 may be a front-end module, an engine compartment module, a chassis, a rolling chassis, an exterior body, or any combination of the foregoing. Each of the left and right front headlight cavities $16_L$, $16_R$ may assume any one of a variety of sizes, shapes, orientations and placements, including a generally vertical orientation 55 as illustrated in FIGS. 1-2. As used herein, a "generally vertical orientation" 55 refers to an orientation of a headlight unit $20_L$, $20_R$, a front headlight cavity $16_L$, $16_R$, and/or of a longitudinal axis 51 (of a headlight unit $20_L$, $20_R$ and its projection lens system 50, as described below), wherein, when the headlight unit $20_L$, $20_R$ is operatively installed in its corresponding front headlight cavity $16_L$, $16_R$, and the body sub-assembly 14 and sub-assembly 10 are operatively installed in the automotive vehicle 12, a first angle α between the longitudinal axis 51 and the vertical direction 57 (as shown in FIG. 2) is less than 45 degrees in the x-z plane 64, and a second angle β between the longitudinal axis 51 and the vertical direction 57 (as shown in FIG. 10) is less than 45 degrees in the y-z plane 66. Alternatively, the generally vertical orientation 55 may be defined such that the first angle α is less than 45, 40, 35, 30, 25, 20, 15, 10 or 5 degrees, and/or such that the second angle β is less than 45, 40, 35, 30, 25, 20, 15, 10 or 5 degrees.

FIG. 3 shows a schematic cross-sectional side view of a headlight unit 20. As described in more detail below, the headlight unit 20 includes a housing 22, a micro-LED device 30 mounted in the housing 22, a relay lens system 40 mounted in the housing 22 a first distance $D_1$ forward of the micro-LED device 30, and a projection lens system 50 mounted in the housing 22 a second distance $D_2$ forward of the relay lens system 40. (Note that a forward direction 26 is shown in FIG. 3, which appears as moving from left to right in the side view of FIG. 3, which is the direction from the rear 25 of the housing 22 to the front 24 of the housing 22.) The micro-LED device 30 has a plurality of forward-facing micro-LEDs 32, wherein first, second and third subsets $34_1$, $34_2$, $34_3$ of the micro-LEDs 32 are arranged in respective first, second and third two-dimensional (2D) arrays $36_1$, $36_2$, $36_3$. The relay lens system 40 includes first, second and third relay lenses $42_1$, $42_2$, $42_3$ configured to receive and relay respective first, second and third streams of light $38_1$, $38_2$, $38_3$ emitted by the first, second and third subsets $34_1$, $34_2$, $34_3$ of micro-LEDs 32. The projection lens system 50 includes first, second and third projection lenses $52_1$, $52_2$, $52_3$ configured to receive and project the first, second and third streams of light $38_1$, $38_2$, $38_3$ in respective first, second and third projection patterns $56_1$, $56_2$, $56_3$.

More specifically, according to one embodiment, the headlight unit 20 includes a housing 22 having a front portion or front 24 and a rear portion or rear 25, with the front 24 defining a forward direction 26. (Alternatively, the forward direction 26 may be defined by the front 24 and rear 25, or as the direction proceeding from the rear 25 to the front 24.) A rearward direction 28 points in the opposite direction of the forward direction 26, and may be defined by the rear 25 (or as the direction proceeding from the front 24 to the rear 25 of the housing 22.)

Figure 5A:
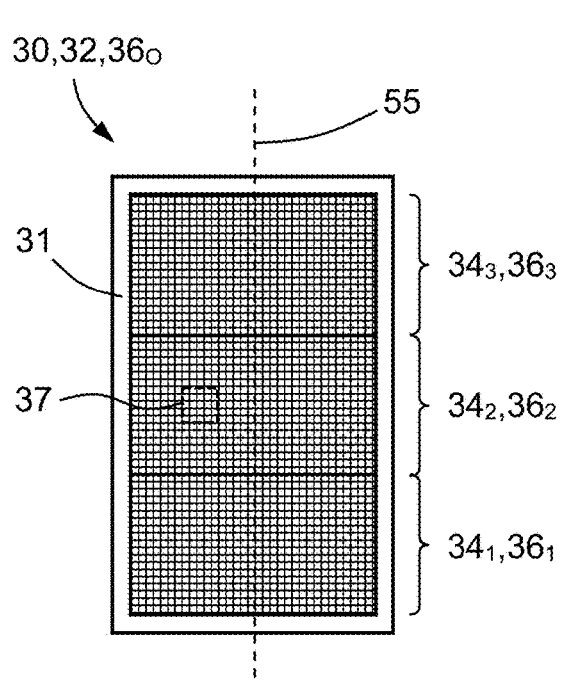
FIGS. 5A-B are schematic front views of micro-LED devices having three and four groups of micro-LEDs, respectively.
Figure 5B:
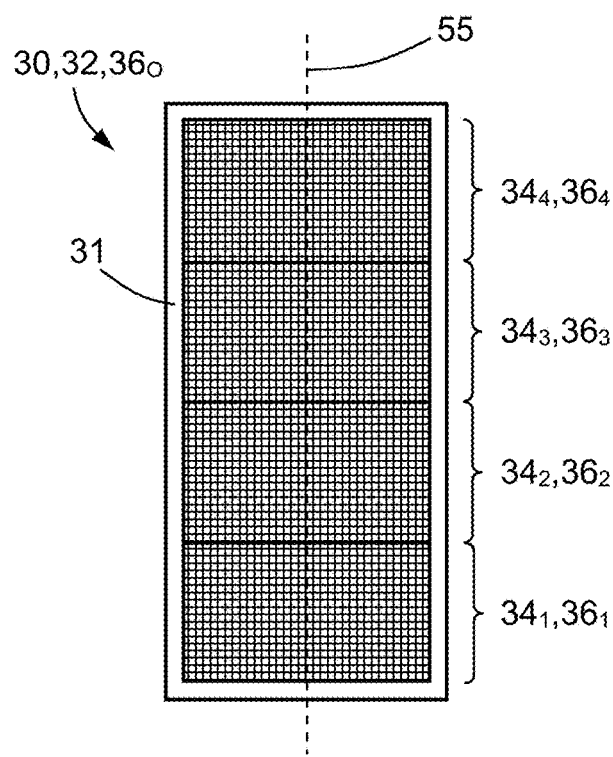
Figure 6:
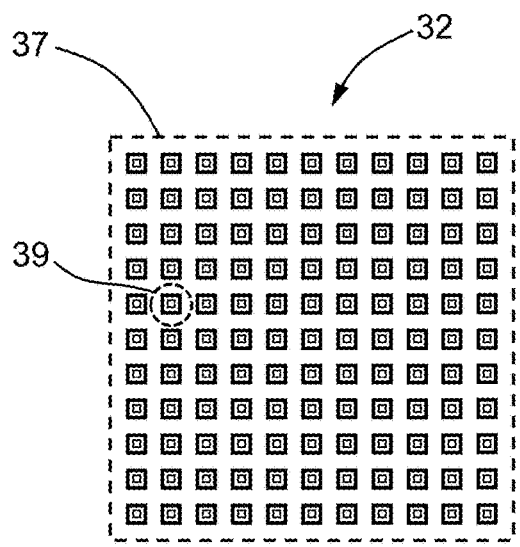
FIG. 6 is a close-up view of the micro-LEDs within the dashed square of FIG. 5.
Figure 7:
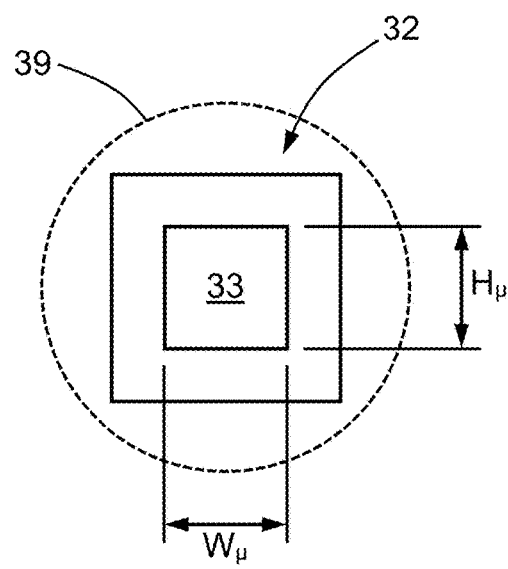
FIG. 7 is a close-up view of the micro-LED within the dashed circle of FIG. 6.

FIGS. 5A-B show schematic front views of micro-LED devices 30 having three and four groups of micro-LEDs 32, respectively, while FIG. 6 shows a close-up view of the micro-LEDs 32 within the dashed square 37 of FIG. 5A, and FIG. 7 shows a close-up view of the micro-LED 32 within the dashed circle 39 of FIG. 6. The micro-LED device 30 has a substrate 31 and a plurality of micro-LEDs 32 operatively mounted on the substrate 31 and facing in the forward direction 26. (That is, with the micro-LED device 30 mounted as illustrated in FIG. 3, each exposed face 33 of the micro-LEDs 32 will be facing in the forward direction 26.) The substrate 31 may be attached to a mount 35, which may be a platen, sapphire, a printed circuit board, an electrical connector, a plastic embossment/platform, or any combination of the foregoing. Two or more electrodes, wires or electrical traces 48 may extend through the housing 22 for powering and controlling the micro-LED device 30 and its individual micro-LEDs 32. The micro-LEDs 32 may be arranged on the substrate 31 in an overall 2D array $36_o$, with the overall 2D array $36_o$ of micro-LEDs 32 comprising three smaller subsets or groupings $34_1$, $34_2$, $34_3$ of micro-LEDs 32. A first subset $34_1$ of the micro-LEDs 32 is arranged in a first 2D array $36_1$, a second subset $34_2$ of the micro-LEDs 32 is arranged in a second 2D array $36_2$, and a third subset $34_3$ of the micro-LEDs 32 is arranged in a third 2D array $36_3$. Optionally, as shown in FIG. 5B, the overall 2D array $36_o$ of micro-LEDs 32 may also include a fourth subset $34_4$ of the micro-LEDs 32 arranged in a fourth 2D array $36_4$. As illustrated in FIGS. 5A-B, the three or four arrays $36_1$, $36_2$, $36_3$, $36_4$ may be arranged with their respective centers aligned along a straight line (e.g., vertical line 57). The micro-LEDs 32 of the overall 2D array $36_o$ may be arranged in a continuous, homogeneous fashion across the entirety of the micro-LED device 30, such that there is no extra spacing provided between neighboring or adjacent arrays $36_1$, $36_2$, $36_3$, $36_4$; alternatively, a row, column or region of extra spacing may be provided between neighboring arrays $36_1$, $36_2$, $36_3$, $36_4$. It should be noted that while the drawings show the three or four subsets 34 or arrays 36 being about the same size and shape as one another, they may also have sizes and shapes that differ from one another.

FIG. 6 shows a close-up view of the dashed square of FIG. 5A, showing a multitude of individual micro-LEDs 32. While the micro-LEDs 32 are illustrated as being arranged in ordered and evenly spaced rows and columns, the micro-LEDs 32 may also be arranged in various other arrangements, including interleaved or staggered rows and columns, and/or having varied spacing between neighboring micro-LEDs 32. FIG. 7 shows a schematic view of a single micro-LED 32, which may comprise a light-emitting element atop a substrate element, with the light-emitting element having a face 33, a height $H_\mu$ and a width $W_\mu$. The height $H_\mu$ and a width $W_\mu$ may each measure about 20-40 m (about 0.00079 to 0.00157 inches), making the micro-LED 32 less than 1/100th the size of a conventional LED. Individual micro-LEDs 32 may be spaced apart from each other with a center-to-center or edge-to-edge pitch of about 40 m (about 0.00157 inches).

It should be noted that the micro-LED device 30 is very different from a collection of ordinary normal-sized LEDs. Each ordinary LED is a discrete and individual semiconductor device, each of which may be manufactured or fabricated as separate devices from other LEDs. However, the micro-LEDs 32 of the micro-LED device 30 are manufactured or fabricated together as a single monolithic device (for example, sharing a single common substrate 31, such as sapphire).

The relay lens system 40 is mounted in the housing 22 forward of the micro-LED device 30, and includes a first relay lens $42_1$ configured to receive and relay a first stream of light $38_1$ emitted by the first subset $34_1$ of micro-LEDs 32, a second relay lens $42_2$ configured to receive and relay a second stream of light $38_2$ emitted by the second subset $34_2$ of micro-LEDs 32, and a third relay lens $42_3$ configured to receive and relay a third stream of light $38_3$ emitted by the third subset $34_3$ of micro-LEDs 32. Each relay lens $42_1$, $42_2$, $42_3$ is located a first distance $D_1$ from its respective subset $34_1$, $34_2$, $34_3$ of micro-LEDs 32. This first distance $D_1$ may be the same for each subset/relay lens pair $34_1/42_1$, $34_2/42_2$, $34_3/42_3$, or it may be slightly different for each subset/relay lens pair. Each relay lens $42_1$, $42_2$, $42_3$ has a respective image plane $46_1$, $46_2$, $46_3$ located forward of the relay lens $42_1$, $42_2$, $42_3$ where the stream of light $38_1$, $38_2$, $38_3$ from each relay lens $42_1$, $42_2$, $42_3$ is focused.

The projection lens system 50 is mounted in the housing 22 forward of the relay lens system 40, and includes a first projection lens $52_1$ configured to receive and project the first stream of light $38_1$ in a first projection pattern $56_1$, a second projection lens $52_2$ configured to receive and project the second stream of light $38_2$ in a second projection pattern $56_2$, and a third projection lens $52_3$ configured to receive and project the third stream of light $38_3$ in a third projection pattern $56_3$. Each projection lens $52_1$, $52_2$, $52_3$ is located a second distance $D_2$ from its respective relay lens $42_1$, $42_2$, $42_3$. This second distance $D_2$ may be the same for each relay lens/projection lens pair $42_1/52_1$, $42_2/52_2$, $42_3/52_3$, or it may be slightly different for each relay lens/projection lens pair. Optionally, the second distance $D_2$ (i.e., from each relay lens $42_1$, $42_2$, $42_3$ to each projection lens $52_1$, $52_2$, $52_3$) may be selected such that each projection lens $52_1$, $52_2$, $52_3$ is located at the image plane $46_1$, $46_2$, $46_3$ of the corresponding relay lens $42_1$, $42_2$, $42_3$.

Each of the relay lenses $42_1$, $42_2$, $42_3$ and projection lenses $52_1$, $52_2$, $52_3$ may be a convex lens, a concave lens, a plano-convex lens, a plano-concave lens, or the like, and each may comprise a single lens or a set of two or more lenses. For example, each of the relay lenses $42_1$, $42_2$, $42_3$ and projection lenses $52_1$, $52_2$, $52_3$ may be a single plano-convex lens. The first, second and third relay lenses $42_1$, $42_2$, $42_3$ may be formed as a first unitary structure 44 (e.g., they may be fabricated from a single piece of lens material), or the lenses $42_1$, $42_2$, $42_3$ may be fabricated as separate lenses from each other. Additionally or alternatively, the first, second and third projection lenses $52_1$, $52_2$, $52_3$ may be formed as a second unitary structure 54. In this way, each first and/or second unitary structure 44, 54 may be easily installed into the housing 22 at its appropriate location.

As illustrated in FIG. 2, the projection lens system 50, as viewed in the rearward direction 28 (i.e., opposite the forward direction 26), may have a longitudinal axis 51 and an average height $H_{avg}$ as measured along the longitudinal axis 51, and a transverse axis 53 perpendicular to the longitudinal axis 51 and an average width $W_{avg}$ as measured along the transverse axis 53, wherein the average width $W_{avg}$ is smaller than the average height $H_{avg}$. In some configurations, the average height $H_{avg}$ may be at least six times larger than the average width $W_{avg}$, thus providing a very thin looking headlight unit 20 (and/or a very thin looking projection lens system 50) as viewed looking in the rearward direction 28. In some configurations, the headlight unit 20 may be configured for operative installation into an automotive vehicle 12 such that the longitudinal axis 51 is oriented in a generally vertical orientation 55, such as illustrated in FIG. 1.

The illumination level of each of the micro-LEDs 32 may be independently controllable. For example, the voltage, current, control signal and/or power fed to each individual micro-LED 32 may be set to fully on (i.e., full illumination), fully off (i.e., no illumination), or anywhere in between (i.e., partial or less-than-full illumination), such as by using software control. The first, second and third projection patterns $56_1$, $56_2$, $56_3$ may be different from each other; for example, the first projection pattern $56_1$ may be an adaptive high-beam pattern or mode $58_{HB}$, the second projection pattern $56_2$ may be a low-beam spot pattern $58_{LB1}$, and the third projection pattern $56_3$ may be a road projection pattern 58IP. Alternatively, the associations mentioned in the previous sentence between the first, second and third projection patterns $56_1$, $56_2$, $56_3$ and the adaptive high-beam pattern $58_{HB}$, the low-beam spot pattern $58_{LB1}$ and the road projection pattern $58_{RP}$ may be rearranged, and other static, dynamic or adaptive beam patterns may be included and/or substituted therein, including low-beam spread patterns $58_{LB2}$.

Figure 14:
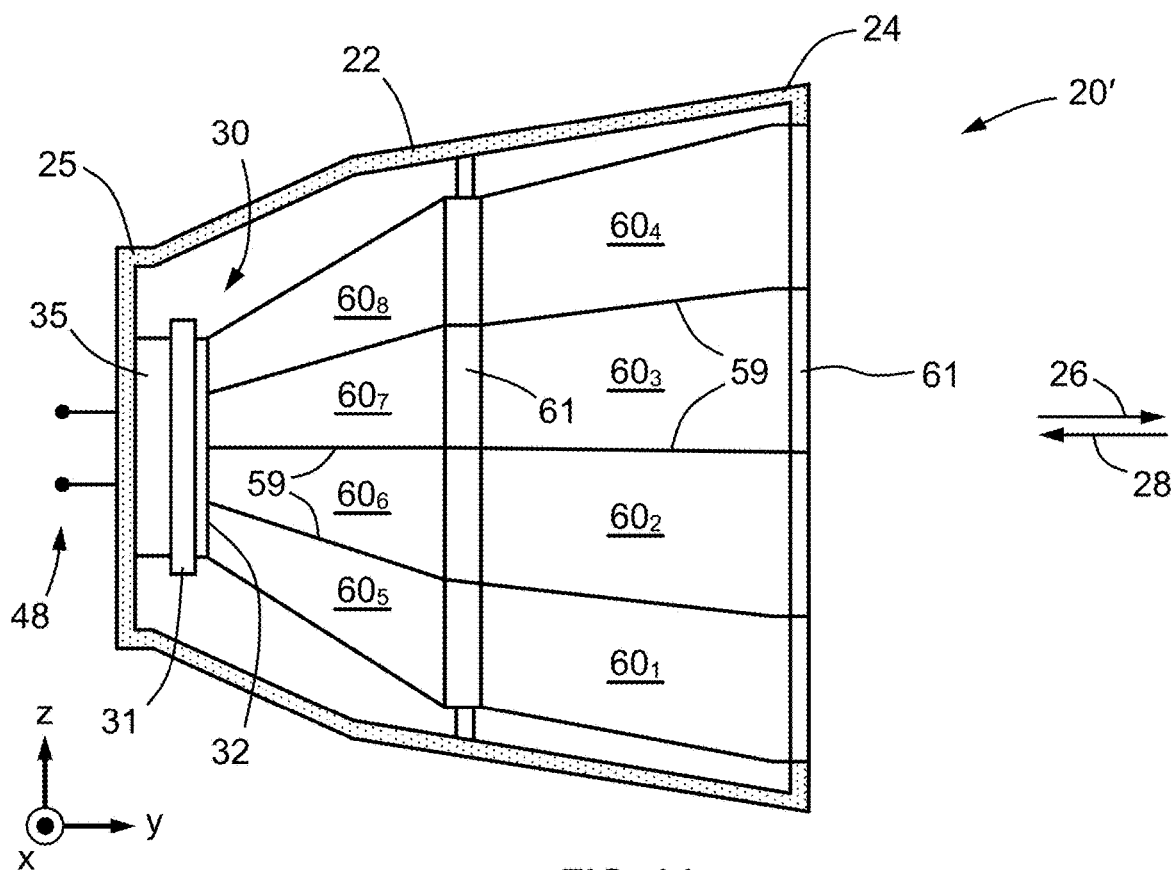
FIG. 14 is a schematic cross-sectional side view of a headlight unit having cavities formed therein.

FIG. 14 shows a schematic cross-sectional side view of an "empty" headlight unit 20' without the relay and projection lens systems 40, 50, showing a variety of cavities formed in the housing 22. These cavities may be provided so as to facilitate the installation of the relay and projection lens systems 40, 50 within the housing 22, and to help hold the various lenses in place. For example, the housing 22 may be provided in a clam shell type of arrangement, with one half of the clam shell appearing like the empty headlight unit 20' shown in FIG. 14, and a matching half (not shown) appearing as essentially a mirror image of the shown half. Each cavity is defined by one or more walls 59, and each cavity may optionally have a socket 61 for receiving a lens therein. (Optionally, one or more of the walls 59 may be silvered or chrome-plated to enhance reflectivity and projection.) The housing 22 may include first, second and third cavities $60_1$, $60_2$, $60_3$ formed therein, wherein the first, second and third cavities $60_1$, $60_2$, $60_3$ may be configured to operatively receive the first, second and third projection lenses $52_1$, $52_2$, $52_3$ therein, respectively. Additionally or alternatively, the housing 22 may include: (i) a fourth cavity $60_4$ formed therein to operatively receive a fourth projection lens $52_4$ therein (described below); (ii) fifth, sixth and seventh cavities $60_5$, $60_6$, $60_7$ formed therein to operatively receive the first, second and third relay lenses $42_1$, $42_2$, $42_3$ therein, respectively; and/or (iii) an eighth cavity $60_5$ formed therein to operatively receive a fourth relay lens $42_4$ therein (described below).

Figure 8:
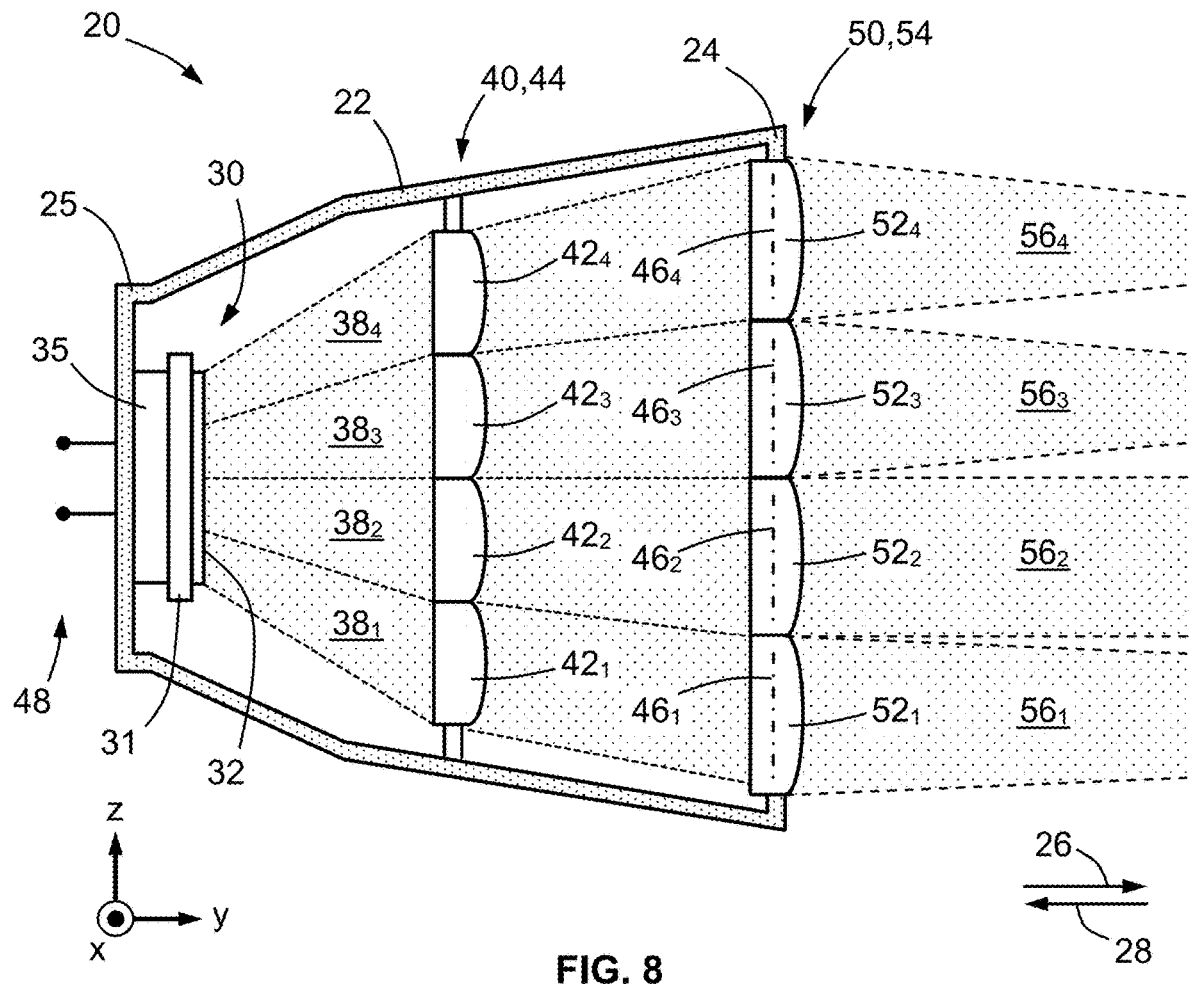
FIG. 8 is a schematic cross-sectional side view of a headlight unit utilizing a micro-LED device with three arrays of micro-LEDs plus an additional light source.

As shown in FIGS. 5B and 8, the micro-LED device 30 may further include a fourth subset $34_4$ of the micro-LEDs 32 arranged in a fourth 2D array $36_4$, the relay lens system 40 may include a fourth relay lens $42_4$ configured to receive and relay a fourth stream of light $38_4$ emitted by the fourth subset $34_4$ of micro-LEDs 32, and the projection lens system 50 may further include a fourth projection lens $52_4$ configured to receive and project the fourth stream of light $38_4$ in a fourth projection pattern $56_4$. In this configuration, the housing 22 may include first, second, third and fourth cavities $60_1$, $60_2$, $60_3$, $60_4$ formed therein, wherein the first, second, third and fourth cavities $60_1$, $60_2$, $60_3$, $60_4$ may be configured to operatively receive the first, second, third and fourth projection lenses $52_1$, $52_2$, $52_3$, $52_4$ therein, respectively. Additionally or alternatively, the housing 22 may include fifth, sixth, seventh and eighth cavities $60_5$, $60_6$, $60_7$, $60_8$ formed therein to operatively receive the first, second, third and fourth relay lenses $42_1$, $42_2$, $42_3$, $42_4$ therein, respectively.

Figure 9:
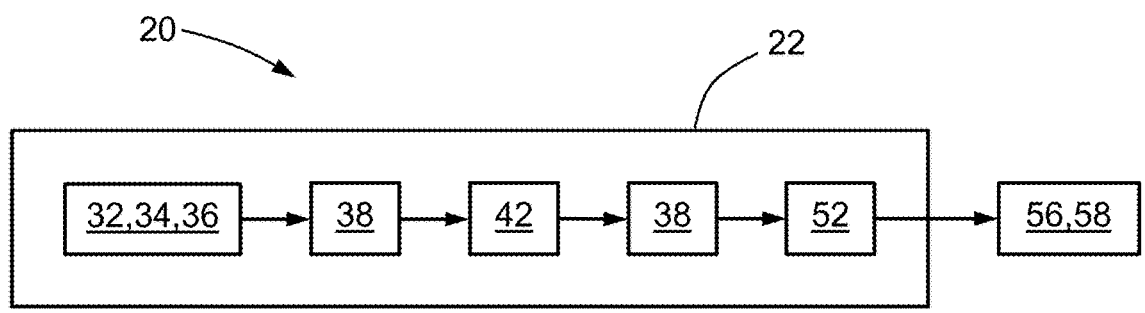
FIG. 9 is a block diagram of the flow of light within and from the headlight unit.

FIG. 9 shows a block diagram of the flow of light within and from the headlight unit 20. As illustrated in the diagram, the streams of light 38 are created by the arrays 36 or subsets 34 of micro-LEDs 32. The relay lenses 42 are configured to receive the streams of light 38 from the micro-LEDs 32, and to relay or project the streams of light 38 forward toward the projection lenses 52. In turn, the projection lenses 52 are configured to receive the streams of light 38 from the relay lenses 42, and to project the streams of light 38 forward to produce the various projection patterns 56, 58.

In another configuration, illustrated in FIG. 10, the housing 22 may include a light source 62 mounted therein (e.g., an HID, incandescent or LED light source) and configured to emit a fourth stream of light $38_4$, and the projection lens system 50 may further include a fourth projection lens $52_4$ configured to receive the fourth stream of light $38_4$ from the light source 61 and project the fourth stream of light $38_4$ in a fourth projection pattern $56_4$. In connection with this configuration, the housing 22 may include first, second, third and fourth cavities $60_1$, $60_2$, $60_3$, $60_4$ formed therein, wherein the first, second, third and fourth cavities $60_1$, $60_2$, $60_3$, $60_4$ may be configured to operatively receive the first, second, third and fourth projection lenses $52_1$, $52_2$, $52_3$, $52_4$ therein, respectively. Additionally or alternatively, the housing 22 may include fifth, sixth and seventh cavities $60_5$, $60_6$, $60_7$ formed therein to operatively receive the first, second and third relay lenses $42_1$, $42_2$, $42_3$ therein, respectively. The light source 62 may be mounted against the interior of the rear wall 27 as illustrated in FIG. 9, or it may be mounted in or against other interior portions of the housing 22. In yet another configuration, the light source 62 may be disposed in another housing separate from the housing 22 shown in the drawings.

In FIG. 10, note that the longitudinal axis 51 of the projection lens system 50 is tilted back by a second angle β as measured from the vertical direction 57 or z-axis. FIGS. 11-12 show schematic front views of two different configurations of headlight units 20 which have three and four projection lenses $52_1$, $52_2$, $52_3$, $52_4$, respectively. Note that while the average width $W_H$ of the housing 22 is shown as being wider than the average width $W_{avg}$ of the projection lens system 50, and the average height $H_H$ of the housing 22 is shown as being taller than the average height $H_{avg}$ of the projection lens system 50, in some configurations the average width $W_H$ of the housing 22 may be the same or less than the average width $W_{avg}$ of the projection lens system 50, and the average height $H_H$ of the housing 22 may be the same or less than the average height $H_{avg}$ of the projection lens system 50. Also, while a spacing 68 is shown between adjacent projection lenses $52_1$, $52_2$, $52_3$, $52_4$, in some configurations there may be no spacing 68 between neighboring projection lenses $52_1$, $52_2$, $52_3$, $52_4$ (such as when the projection lenses $52_1$, $52_2$, $52_3$, $52_4$ are fabricated as a second unitary structure 54). It should be noted that while the headlight unit 20 and projection lens system 50 are depicted in the drawings as having a straight linear shape, the headlight unit 20 and/or projection lens system 50 may assume other shapes as well, including arcuate shapes, and two or more straight or arcuate segments joined by sharp or rounded corners.

According to another embodiment, a headlight unit 20 includes: (i) a housing 22 having a front 24 defining a forward direction 26; (ii) a micro-LED device 30 mounted in the housing 22, the micro-LED device 30 having a substrate 31 and a plurality of micro-LEDs 32 mounted on the substrate 31 and facing in the forward direction 26 wherein a respective illumination level of each of the micro-LEDs 32 is independently controllable, wherein first, second and third subsets $34_1$, $34_2$, $34_3$ of the micro-LEDs 32 are arranged in respective first, second and third 2D arrays $36_1$, $36_2$, $36_3$; (iii) a relay lens system 40 mounted in the housing 22 forward of the micro-LED device 30, the relay lens system 40 including a first relay lens $42_1$ configured to receive and relay a first stream of light $38_1$ emitted by the first subset $34_1$ of micro-LEDs 32, a second relay lens $42_2$ configured to receive and relay a second stream of light $38_2$ emitted by the second subset $34_2$ of micro-LEDs 32, and a third relay lens $42_3$ configured to receive and relay a third stream of light $38_3$ emitted by the third subset $34_3$ of micro-LEDs 32; and (iv) a projection lens system 50 mounted in the housing 22 forward of the relay lens system 40, wherein the projection lens system 50, as viewed in a rearward direction 28 opposite the forward direction 26, has a longitudinal axis 51 and an average height $H_{avg}$ as measured along the longitudinal axis 51, and a transverse axis 53 perpendicular to the longitudinal axis 51 and an average width $W_{avg}$ as measured along the transverse axis 53, wherein the average height $H_{avg}$ is at least six times larger than the average width $W_{avg}$, the projection lens system 50 including a first projection lens $52_1$ located at the first image plane $46_1$ and configured to project the first stream of light $38_1$ in an adaptive high-beam pattern $58_{HB}$, a second projection lens $52_2$ located at the second image plane $46_2$ and configured to project the second stream of light $38_2$ in a low-beam spot pattern $58_{LB1}$, and a third projection lens $52_3$ located at the third image plane $46_3$ and configured to project the third stream of light $38_3$ in a road projection pattern $581u$.

The housing 22 may include first, second and third cavities $60_1$, $60_2$, $60_3$ formed therein, wherein the first, second and third cavities $60_1$, $60_2$, $60_3$ may be configured to operatively receive the first, second and third projection lenses $52_1$, $52_2$, $52_3$ therein, respectively. In one configuration, the micro-LED device 30 may further include a fourth subset $34_4$ of the micro-LEDs 32 arranged in a fourth two-dimensional array $36_4$, the relay lens system 40 may include a fourth relay lens $42_4$ configured to relay a fourth stream of light $38_4$ emitted by the fourth subset $34_4$ of micro-LEDs 32 to a fourth image plane 464, and the projection lens system 50 may further include a fourth projection lens $52_4$ located at the fourth image plane 464 and configured to project the fourth stream of light $38_4$ in a low-beam spread pattern $58_{LB2}$. Alternatively, the housing 22 may further include a light source 62 mounted therein, the relay lens system 40 may include a fourth relay lens $42_4$ configured to relay a fourth stream of light $38_4$ emitted by the light source 62 to a fourth image plane 464, and the projection lens system 50 may further include a fourth projection lens $52_4$ located at the fourth image plane 464 and configured to project the fourth stream of light $38_4$ in a low-beam spread pattern $58_{LB2}$.

According to yet another embodiment, a sub-assembly 10 for an automotive vehicle 12 includes: (i) a body sub-assembly 14 having left and right front headlight mounting cavities $16_L$, $16_R$, wherein each of the cavities $16_L$, $16_R$ is configured for operatively receiving a respective headlight unit $20_L$, $20_R$ therein; (ii) left and right headlight units $20_L$, $20_R$ operatively disposed in the left and right front headlight mounting cavities $16_L$, $16_R$, respectively, wherein each of the headlight units $20_L$, $20_R$ includes respective ones of: (a) a housing 22 having a front 24 defining a forward direction 26; (b) a micro-LED device 30 mounted in the housing 22, the micro-LED device 30 having a substrate 31 and a plurality of micro-LEDs 32 mounted on the substrate 31 and facing in the forward direction 26 wherein a respective illumination level of each of the micro-LEDs 32 is independently controllable, wherein first, second and third subsets $34_1$, $34_2$, $34_3$ of the micro-LEDs 32 are arranged in respective first, second and third 2D arrays $36_1$, $36_2$, $36_3$; (c) a relay lens system 40 mounted in the housing 22 forward of the micro-LED device 30, the relay lens system 40 including first, second and third relay lenses $42_1$, $42_2$, $42_3$ configured to relay respective first, second and third streams of light $38_1$, $38_2$, $38_3$ emitted by the first, second and third subsets $34_1$, $34_2$, $34_3$ of micro-LEDs 32, respectively, to respective first, second and third image planes $46_1$, $46_2$, $46_3$; and (d) a projection lens system 50 mounted in the housing 22 forward of the relay lens system 40, wherein the projection lens system 50, as viewed in a rearward direction 26 opposite the forward direction 26, has a longitudinal axis 51 and an average height $H_{avg}$ as measured along the longitudinal axis 51, and a transverse axis 53 perpendicular to the longitudinal axis 51 and an average width $W_{avg}$ as measured along the transverse axis 53, wherein the average height $H_{avg}$ is larger than the average width $W_{avg}$, the projection lens system 50 including a first projection lens $52_1$ located at the first image plane $46_1$ and configured to project the first stream of light $38_1$ in an adaptive high-beam pattern $58_{HB}$, a second projection lens $52_2$ located at the second image plane $46_2$ and configured to project the second stream of light $38_2$ in a low-beam spot pattern $58_{LB1}$, and a third projection lens $52_3$ located at the third image plane $46_3$ and configured to project the third stream of light $38_3$ in a road projection pattern $58_{RP}$; (iii) wherein the housing 22 includes first, second and third cavities $60_1$, $60_2$, $60_3$ formed therein, wherein the first, second and third cavities $60_1$, $60_2$, $60_3$ are configured to operatively receive the first, second and third projection lenses $52_1$, $52_2$, $52_3$ therein, respectively.

In this configuration, the housing 22 may further include a fourth cavity $60_4$ formed therein, the micro-LED device 30 may further include a fourth subset $34_4$ of the micro-LEDs 32 arranged in a fourth 2D array $36_4$, the relay lens system 40 may include a fourth relay lens $42_4$ configured to relay a fourth stream of light $38_4$ emitted by the fourth subset $34_4$ of micro-LEDs 32 to a fourth image plane 464, and the projection lens system 50 may further include a fourth projection lens $52_4$ located at the fourth image plane 464 and configured to project the fourth stream of light $38_4$ in a low-beam spread pattern $58_{LB2}$, wherein the fourth cavity $60_4$ is configured to operatively receive the fourth projection lens $52_4$ therein. Alternatively, the housing 22 may further include a fourth cavity $60_4$ formed therein, the housing 22 may further include a light source 62 mounted therein, the relay lens system 40 may include a fourth relay lens $42_4$ configured to relay a fourth stream of light $38_4$ emitted by the light source 62 to a fourth image plane 464, and the projection lens system 50 may further include a fourth projection lens $52_4$ located at the fourth image plane 464 and configured to project the fourth stream of light $38_4$ in a low-beam spread pattern $58_{LB2}$, wherein the fourth cavity $60_4$ is configured to operatively receive the fourth projection lens $52_4$ therein. Further, in any of the foregoing configurations, each of the left and right front headlight mounting cavities $16_L$, $16_R$ may be oriented such that the respective longitudinal axis 51 of each respective projection lens system 50 is oriented in a generally vertical orientation 55.

FIG. 13 shows a schematic top view of an ego or subject vehicle 70 in a first lane 80 of a highway. Also shown is a leading vehicle 72 ahead of the ego/subject vehicle 70 in the same (first) lane 80, and an oncoming vehicle 74 heading toward the ego/subject vehicle 70 in an adjacent second lane 82. The arc sectors shown represent various lighted sectors or zones 76 lit by the headlight units 20, as well as darkened sectors or zones 78 that are less illuminated than the lighted zones 76 (or optionally not illuminated at all). The ego/subject vehicle 70 includes sensors or other hardware (not shown) for determining the locations and speeds of the leading and oncoming vehicles 72, 74, as well as the locations of other object of interest such as reflective traffic signs, pedestrians, cyclists, etc. Systems (not shown) aboard the ego/subject vehicle 70 use the locations and speeds of vehicles and objects to determine which of the individual micro-LEDs 32 to turn on, and to what intensity or illumination level. Thus, the micro-LED device 30 is capable of producing the lighted and darkened zones 76, 78 so that other vehicles 72, 74 and reflective traffic signs are lit up with reduced (or no) lighting, while other zones 76 are well illuminated.

Figure 15:
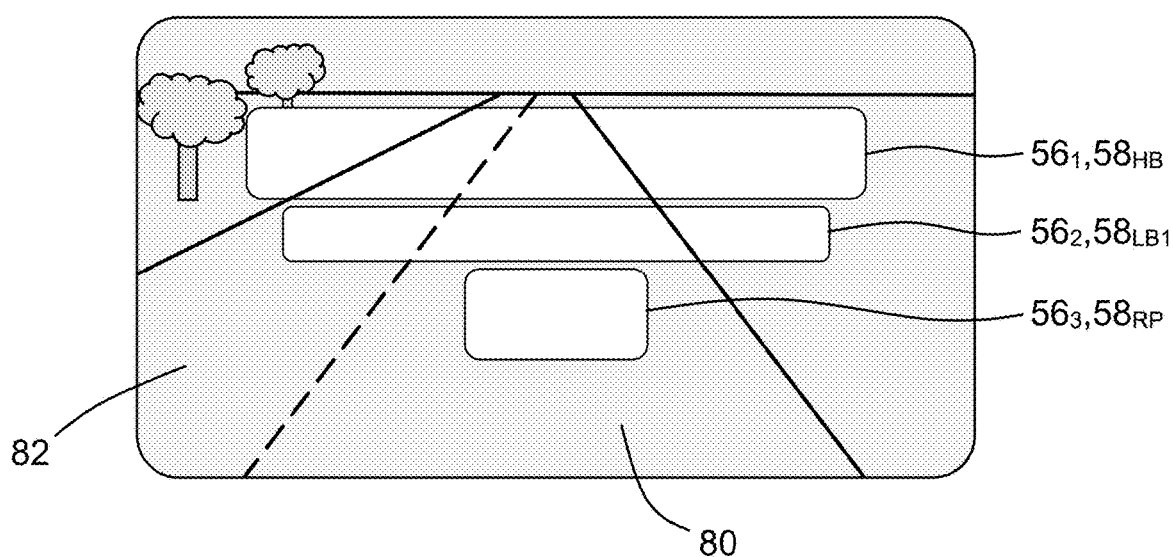
FIG. 15 is a schematic view of a highway from the perspective of a driver in a vehicle, showing various projection patterns made by a headlight unit.

FIG. 15 shows a schematic view of a highway from the perspective of a driver in a vehicle 12, 70, showing various projection patterns $56_1$, $56_2$, $56_3$ made by the headlight unit 20. For example, a first projection pattern $56_1$ may be an adaptive high-beam projection pattern $58_{HB}$, a second projection pattern $56_2$ may be a low-beam spot pattern $58_{LB1}$, and a third projection pattern $56_3$ may be a road projection pattern $58_{RP}$ in which images are cast onto the road surface ahead of the vehicle 12, 70. Note that the various projection patterns $56_1$, $56_2$, $56_3$, $58_{HB}$, $58_{LB1}$, $58_{RP}$ shown in FIG. 15 are for illustration purposes only, and may vary in shape and size and may overlap one another. Also, while not shown in FIG. 15, a low-beam spread pattern $58_{LB2}$ may also be produced by the headlight unit 20.

Figure 16:
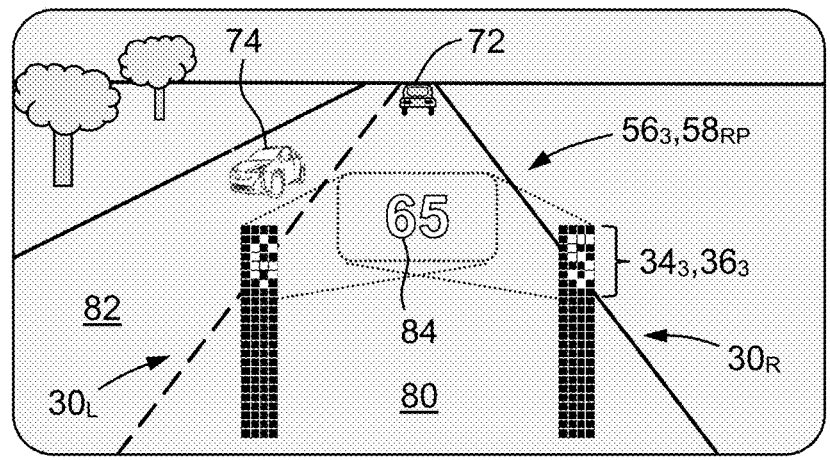
FIGS. 16-18 are schematic views of a highway from the perspective of a driver in a vehicle, showing a driving scene and first, second and third lighting arrangements, respectively, with representations superimposed on the driving scene of micro-LEDs turned on or off to produce the respective lighting arrangements.
Figure 17:
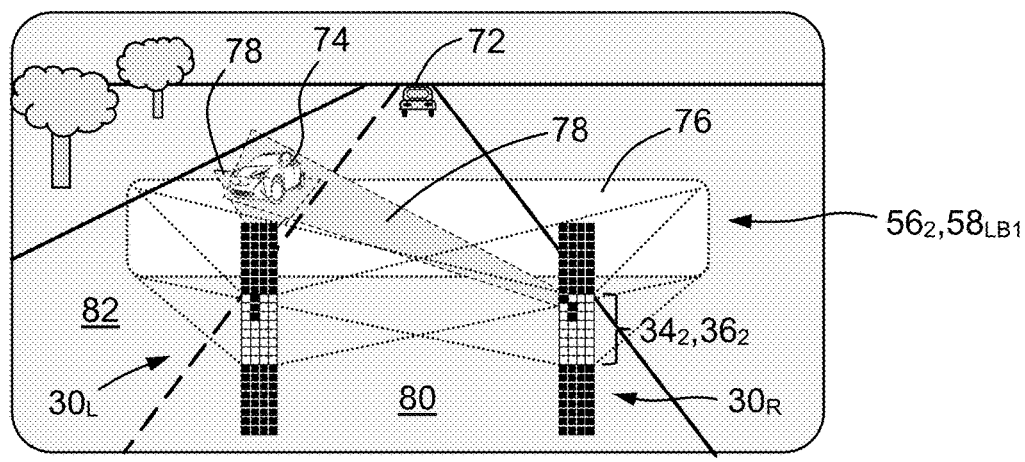
Figure 18:
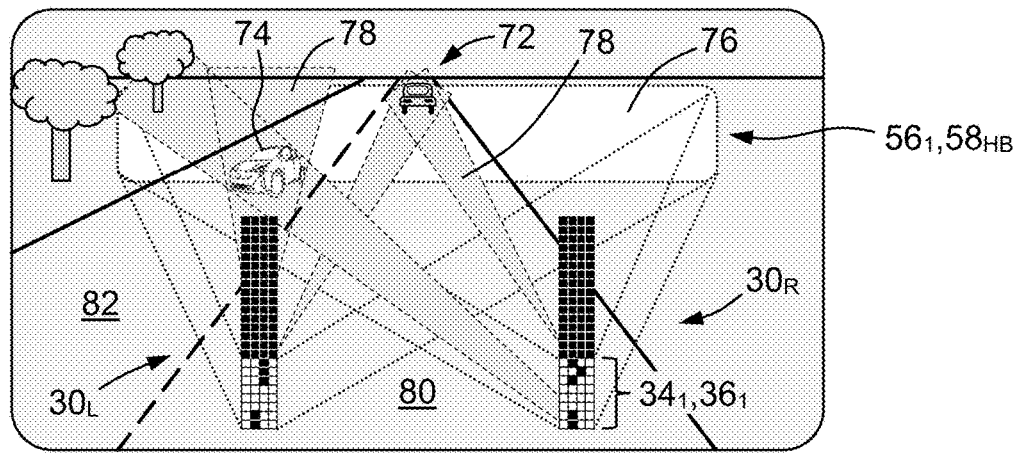

FIGS. 16-18 show schematic views of a highway from the perspective of a driver in a vehicle 12, 70, showing a driving scene and first, second and third lighting arrangements, respectively, with representations superimposed on the driving scene of left and right micro-LED devices $30_L$, $30_R$, with their respective micro-LEDs 32 being turned on or off to produce each of the three lighting arrangements. In all three lighting arrangements, one leading vehicle and one oncoming vehicle 72, 74 are shown, and the views are darkened or grayed over to indicate a dusk or darkness condition. Also, in all three lighting arrangements, the micro-LED device 30 is arranged with the first subset or array $34_1$, $36_1$ of micro-LEDs 32 located on the "bottom" for producing a first projection pattern $56_1$ which may be a high-beam pattern $58_{HB}$, the second subset or array $34_2$, $36_2$ of micro-LEDs 32 located in the "middle" for producing a second projection pattern $56_2$ which may be a low-beam pattern $58_{LB1}$, and the third subset or array $34_3$, $36_3$ of micro-LEDs 32 located at the "top" of the micro-LED device 30 for producing a third projection pattern $56_3$ which may be a road projection pattern 58IP. However, note that this arrangement with the top, middle and bottom subsets/arrays 34, 36 being assigned to produce road, low-beam and high-beam projections $58_{RP}$, $58_{LB1}$, $58_{HM}$, respectively, is merely for illustrations purposes, as these and other projections may be assigned to the top, middle and bottom subsets/arrays 34, 36 as desired.

In the first lighting arrangement of FIG. 16, the third subset or array $34_3$, $36_3$ of micro-LEDs 32 located at the "top" of the micro-LED device 30 are selectively turned on or off to produce the road projection 84, illustrated as the numerals "65" cast onto the road surface. (This may indicate the speed of the vehicle 12, 70 in miles per hour.) In the second lighting arrangement of FIG. 17, the second subset or array $34_2$, $36_2$ of micro-LEDs 32 located in the "middle" of the micro-LED device 30 are selectively turned on or off to produce a variable low-beam spot projection $58_{LB1}$, in which each of the two micro-LED devices 30 produces a respective darkened zone 78 in the direction of the oncoming vehicle 74 which has egressed into the second projection pattern or zone $56_2$. And in the third lighting arrangement of FIG. 18, the first subset or array $34_1$, $36_1$ of micro-LEDs 32 located at the "bottom" of the micro-LED device 30 are selectively turned on or off to produce an adaptive high-beam projection $58_{HB}$, in which each of the two micro-LED devices 30 produces a respective darkened zone 78 in the direction of the leading vehicle 72 which is situated in the first projection pattern or zone $56_1$, as well as a respective darkened zone 78 in the direction of the oncoming vehicle 74 which is also situated in the first projection pattern or zone $56_1$. Note that each of the first, second and third subsets $34_1$, $34_2$, $34_3$ or arrays $36_1$, $36_2$, $36_3$ is illustrated in FIGS. 16-18 are an 8-by-4 matrix of micro-LEDs 32, where each of the small squares in each matrix that is either black (turned off) or white (turned on) represents a single micro-LED 32 or "pixel". However, this is merely for illustration purposes; in real-world implementation, each of these $34_1$, $34_2$, $34_3$ or arrays $36_1$, $36_2$, $36_3$ may include hundreds or thousands of individual micro-LEDs 32.

The left and right micro-LED devices $30_L$, $30_R$ may be controlled independently, with each side producing a different lighting pattern than the other side, but with both micro-LEDs $30_L$, $30_R$ cooperating to produce a desired overall lighting pattern. In any of the low-beam or high-beam projection modes $58_{LB1}$, $58_{LB1}$, $58_{HB}$ (including those not explicitly mentioned herein), the illumination levels of the individual micro-LEDs 32 may be controlled by software or programming to dynamically "bend" or "steer" the beams emanating from the left and/or right headlight units $20_L$, $20_R$, such as aiming the headlight beams in the direction of a left or right turn, and "steering" darkened regions 78 so they remain pointed at leading or oncoming vehicles 72, 74. It should also be noted that the three projection patterns $56_1$, $56_2$, $56_3$ may be utilized one at a time, two at a time, or all three at a time.

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "for the most part", "to a significant extent" and/or "to a large degree", and do not necessarily mean "perfectly", "completely", "strictly" or "entirely". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A headlight unit, comprising:
   a housing having a front defining a forward direction;
   a micro-LED device mounted in the housing, the micro-LED device having a substrate and a plurality of micro-LEDs mounted on the substrate and facing in the forward direction, wherein a first subset of the micro-LEDs is arranged in a first two-dimensional (2D) array, a second subset of the micro-LEDs is arranged in a second 2D array, and a third subset of the micro-LEDs is arranged in a third 2D array;
   a relay lens system mounted in the housing forward of the micro-LED device, the relay lens system including a first relay lens configured to receive and relay a first stream of light emitted by the first subset of micro-LEDs, a second relay lens configured to receive and relay a second stream of light emitted by the second subset of micro-LEDs, and a third relay lens configured to receive and relay a third stream of light emitted by the third subset of micro-LEDs; and a projection lens system mounted in the housing forward of the relay lens system, the projection lens system including a first projection lens configured to receive and project the first stream of light in a first projection pattern, a second projection lens configured to receive and project the second stream of light in a second projection pattern, and a third projection lens configured to receive and project the third stream of light in a third projection pattern.

2. The headlight unit of claim 1, wherein the projection lens system, as viewed in a rearward direction opposite the forward direction, has a longitudinal axis and an average height as measured along the longitudinal axis, and a transverse axis perpendicular to the longitudinal axis and an average width as measured along the transverse axis, wherein the average width is smaller than the average height.

3. The headlight unit of claim 2, wherein the average height is at least six times larger than the average width.

4. The headlight unit of claim 1, wherein a respective illumination level of each of the micro-LEDs is independently controllable.

5. The headlight unit of claim 1, wherein the first, second and third relay lenses are formed as a first unitary structure, and/or the first, second and third projection lenses are formed as a second unitary structure.

6. The headlight unit of claim 1, wherein the headlight unit is configured for operative installation into an automotive vehicle such that the longitudinal axis is oriented in a generally vertical orientation.

7. The headlight unit of claim 1, wherein the first projection pattern is an adaptive high-beam pattern, the second projection pattern is a low-beam spot pattern, and the third projection pattern is a road projection pattern.

8. The headlight unit of claim 1, wherein the housing includes first, second and third cavities formed therein, wherein the first, second and third cavities are configured to operatively receive the first, second and third projection lenses therein, respectively.

9. The headlight unit of claim 1, wherein the micro-LED device further includes a fourth subset of the micro-LEDs arranged in a fourth two-dimensional array, the relay lens system includes a fourth relay lens configured to receive and relay a fourth stream of light emitted by the fourth subset of micro-LEDs, and the projection lens system further includes a fourth projection lens configured to receive and project the fourth stream of light in a fourth projection pattern.

10. The headlight unit of claim 9, wherein the housing includes first, second, third and fourth cavities formed therein, wherein the first, second, third and fourth cavities are configured to operatively receive the first, second, third and fourth projection lenses therein, respectively.

11. The headlight unit of claim 1, wherein the housing further includes a light source mounted therein and configured to emit a fourth stream of light, and the projection lens system further includes a fourth projection lens configured to receive and project the fourth stream of light in a fourth projection pattern.

12. The headlight unit of claim 11, wherein the housing includes first, second, third and fourth cavities formed therein, wherein the first, second, third and fourth cavities are configured to operatively receive the first, second, third and fourth projection lenses therein, respectively.

13. A headlight unit, comprising:
a housing having a front defining a forward direction;
a micro-LED device mounted in the housing, the micro-LED device having a substrate and a plurality of micro-LEDs mounted on the substrate and facing in the forward direction wherein a respective illumination level of each of the micro-LEDs is independently controllable, wherein first, second and third subsets of the micro-LEDs are arranged in respective first, second and third two-dimensional arrays;
a relay lens system mounted in the housing forward of the micro-LED device, the relay lens system including a first relay lens configured to receive and relay a first stream of light emitted by the first subset of micro-LEDs, a second relay lens configured to receive and relay a second stream of light emitted by the second subset of micro-LEDs, and a third relay lens configured to receive and relay a third stream of light emitted by the third subset of micro-LEDs; and
a projection lens system mounted in the housing forward of the relay lens system, wherein the projection lens system, as viewed in a rearward direction opposite the forward direction, has a longitudinal axis and an average height as measured along the longitudinal axis, and a transverse axis perpendicular to the longitudinal axis and an average width as measured along the transverse axis, wherein the average height is at least six times larger than the average width, the projection lens system including a first projection lens configured to receive and project the first stream of light in an adaptive high-beam pattern, a second projection lens configured to receive and project the second stream of light in a low-beam spot pattern, and a third projection lens configured to receive and project the third stream of light in a road projection pattern.

14. The headlight unit of claim 13, wherein the housing includes first, second and third cavities formed therein, wherein the first, second and third cavities are configured to operatively receive the first, second and third projection lenses therein, respectively.

15. The headlight unit of claim 13, wherein the micro-LED device further includes a fourth subset of the micro-LEDs arranged in a fourth two-dimensional array, the relay lens system includes a fourth relay lens configured to receive and relay a fourth stream of light emitted by the fourth subset of micro-LEDs, and the projection lens system further includes a fourth projection lens configured to receive and project the fourth stream of light in a low-beam spread pattern.

16. The headlight unit of claim 13, wherein the housing further includes a light source mounted therein and configured to emit a fourth stream of light, and the projection lens system further includes a fourth projection lens configured to receive and project the fourth stream of light in a low-beam spread pattern.

17. A sub-assembly for an automotive vehicle, comprising:
a body sub-assembly having left and right front headlight mounting cavities, wherein each of the cavities is configured for operatively receiving a respective headlight unit therein;
left and right headlight units operatively disposed in the left and right front headlight mounting cavities, respectively, wherein each of the headlight units includes respective ones of:
a housing having a front defining a forward direction;
a micro-LED device mounted in the housing, the micro-LED device having a substrate and a plurality of micro-LEDs mounted on the substrate and facing in the forward direction wherein a respective illumination level of each of the micro-LEDs is independently controllable, wherein first, second and third subsets of the micro-LEDs are arranged in respective first, second and third two-dimensional arrays;

a relay lens system mounted in the housing forward of the micro-LED device, the relay lens system including first, second and third relay lenses configured to receive and relay respective first, second and third streams of light emitted by the first, second and third subsets of micro-LEDs, respectively; and a projection lens system mounted in the housing forward of the relay lens system, wherein the projection lens system, as viewed in a rearward direction opposite the forward direction, has a longitudinal axis and an average height as measured along the longitudinal axis, and a transverse axis perpendicular to the longitudinal axis and an average width as measured along the transverse axis, wherein the average height is larger than the average width, the projection lens system including a first projection lens configured to receive and project the first stream of light in an adaptive high-beam pattern, a second projection lens configured to receive and project the second stream of light in a low-beam spot pattern, and a third projection lens configured to receive and project the third stream of light in a road projection pattern;

wherein the housing includes first, second and third cavities formed therein, wherein the first, second and third cavities are configured to operatively receive the first, second and third projection lenses therein, respectively.

18. The headlight unit of claim 17, wherein the housing further includes a fourth cavity formed therein, the micro-LED device further includes a fourth subset of the micro-LEDs arranged in a fourth two-dimensional array, the relay lens system includes a fourth relay lens configured to receive and relay a fourth stream of light emitted by the fourth subset of micro-LEDs, and the projection lens system further includes a fourth projection lens configured to receive and project the fourth stream of light in a low-beam spread pattern, wherein the fourth cavity is configured to operatively receive the fourth projection lens therein.

19. The headlight unit of claim 17, wherein the housing further includes a fourth cavity formed therein, the housing further includes a light source mounted therein and configured to emit a fourth stream of light, and the projection lens system further includes a fourth projection lens configured to receive and project the fourth stream of light in a low-beam spread pattern, wherein the fourth cavity is configured to operatively receive the fourth projection lens therein.

20. The headlight unit of claim 17, wherein each of the left and right front headlight mounting cavities is oriented such that the respective longitudinal axis of each respective projection lens system is oriented in a generally vertical orientation.

* * * * *